United States Patent
Sung et al.

(10) Patent No.: US 10,096,857 B2
(45) Date of Patent: Oct. 9, 2018

(54) GARNET-TYPE SOLID ELECTROLYTE AND METHOD FOR PREPARING THE SAME

(71) Applicant: Hyundai Motor Company, Seoul (KR)

(72) Inventors: Ju Young Sung, Gyeonggi-do (KR); Eun Ji Kwon, Gyeonggi-do (KR); Ji Na Kim, Gyeonggi-do (KR); Yong Jun Jang, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 263 days.

(21) Appl. No.: 14/935,762

(22) Filed: Nov. 9, 2015

(65) Prior Publication Data

US 2016/0190639 A1    Jun. 30, 2016

(30) Foreign Application Priority Data

Dec. 30, 2014 (KR) .................. 10-2014-0194121

(51) Int. Cl.
*H01M 10/0562* (2010.01)
*H01M 10/0525* (2010.01)

(52) U.S. Cl.
CPC ... *H01M 10/0562* (2013.01); *H01M 10/0525* (2013.01); *H01M 2300/0071* (2013.01); *H01M 2300/0074* (2013.01)

(58) Field of Classification Search
CPC ................. H01M 10/0562; H01M 10/0525
See application file for complete search history.

(56) References Cited

U.S. PATENT DOCUMENTS

2013/0344416 A1   12/2013   Sakamoto et al.

FOREIGN PATENT DOCUMENTS

| JP | 1995-169456 | * | 7/1995 | .............. H01M 4/02 |
|---|---|---|---|---|
| JP | 2010-202499 | A | 9/2010 | |
| JP | 2011-051800 | A | 3/2011 | |
| JP | 5273732 | B2 | 8/2013 | |
| JP | 5283188 | B2 | 9/2013 | |
| KR | 10-2013-0008623 | | 1/2013 | |
| KR | 10-2014-0127443 | A | 11/2014 | |

OTHER PUBLICATIONS

Rangasamy et al., Solid state Ion (The role of Al and li concentration on the formation of cubic garnet solid electrolyte of nominal composition Li7La3Zr2O7), 2011, doi:10.1016/jssi.Oct. 22, 2011.*

* cited by examiner

*Primary Examiner* — Helen Oi K Conley
(74) *Attorney, Agent, or Firm* — Mintz Levin Cohn Ferris Glovsky and Popeo, P.C.; Peter F. Corless

(57) ABSTRACT

Disclosed are a garnet-type solid electrolyte and a method for preparing the same. The garnet-based solid electrolyte of the present invention is prepared by adding $Al_2O_3$ to a precursor containing hydroxide, thereby enhancing sintered density and ionic conductivity while having a pure cubic phase crystal structure without including impurities.

8 Claims, 11 Drawing Sheets

GARNET-TYPE SOLID ELECTROLYTE AND METHOD FOR PREPARING THE SAME

CROSS-REFERENCE TO RELATED APPLICATION

This application claims under 35 U.S.C. § 119(a) the benefit of Korean Patent Application No. 10-2014-0194121 filed on Dec. 30, 2014, the entire contents of which are incorporated herein by reference.

TECHNICAL FIELD

The present invention relates to a garnet-type solid electrolyte and a method for preparing the same. In particular, the garnet-type solid electrolyte may be prepared by adding an aluminum oxide ($Al_2O_3$) to a precursor containing hydroxide, thereby enhancing sintered density and ionic conductivity while having a pure cubic phase crystal structure without including impurities.

BACKGROUND

A secondary battery repeats charging and discharging as chemical energy and electric energy are interconverted each other by chemical reactions of oxidation and reduction. The secondary battery generally includes four basic elements, that is, an anode, a cathode, a separator and an electrolyte. Herein, the anode and the cathode are also referred to as an electrode, and the electrode includes active materials causing an actual reaction.

For example a lithium ion secondary battery uses a liquid electrolyte. However, the liquid electrolyte may have disadvantages, since it is volatile, such as a danger of explosion, and inferior thermal stability.

Meanwhile, an all solid state battery using a solid electrolyte may have low danger of explosion, and also have improved thermal stability. In addition, when a bi-polar plate is used, a high operating voltage may be obtained by laminating electrode through a series connection, such that higher energy density may be obtained compared to the energy density of the battery that uses the liquid electrolyte in a series of cell connection.

The all solid state battery requires a solid electrolyte transferring lithium ions. The solid electrolyte may be classified largely into an organic (polymer) electrolyte and an inorganic electrolyte, and the inorganic electrolyte may include an oxide-based electrolyte and a sulfide-based electrolyte.

For instance, the oxide-based solid electrolyte may include oxygen, such as a LiPON-type, a perovskite-type, a garnet-type and a glass ceramic-type, and have an ionic conductivity of $10^{-5}$ to $10^{-3}$ S/cm that is less than that of a sulfide-based electrolyte. Meanwhile, the oxide-based solid electrolyte may provide advantages such that an oxide-based solid electrolyte can be stable with respect to moisture and have low reactivity with oxygen in the atmosphere, when compared to a sulfide-based solid electrolyte.

However, the oxide-based solid electrolyte may have high grain boundary resistance, and therefore, an electrolyte membrane or pellets, in which necking between the particles are formed from high temperature sintering, may be used. Further, the oxide-based solid electrolyte may not be produced in large amount, since a large-area electrolyte membrane thereof may not be formed due to high temperature of sintering, i.e. from about 900 to about 1400° C.

Particularly, the garnet-type electrolyte among the oxide-based solid electrolytes may strictly require a long time for about 6 hours or longer at a temperature of 1000 to 1250° C. in final calcination. In addition, in order to prevent lithium volatilization and to secure phase changes and composition uniformity, pellet-covered garnet may be used as imitation. However, the proportion of the garnet obtained using such pellets may be usually less than 20% by weight with respect to the total weight, which is considered as being inefficient.

The US Patent Application Laid-Open Publication No. 2013-0344416 has disclosed solid oxide ceramics prepared by hot pressing pellets that may be prepared including lithium carbonate, lanthanum hydroxide, zirconium oxide and alumina, however, the thus prepared pellet-type LLZ may be formed to have low crystallizability.

Accordingly, in order to prepare the garnet having excellent physical properties, many researches including basic physical property studies and garnet preparation have been progressed, and furthermore, development on the materials capable of being utilized in a manufacturing process of all solid state batteries has been required.

The above information disclosed in this Background section is only for enhancement of understanding of the background of the invention and therefore it may contain information that does not form the prior art that is already known in this country to a person of ordinary skill in the art.

SUMMARY OF THE INVENTION

In preferred aspects, the present invention provides a method of preparing a garnet-type solid electrolyte. The inventors of the present invention have found out that, by adding a small amount of $Al_2O_3$ to a precursor containing hydroxide instead of a conventional precursor containing carbonate during a garnet-type solid electrolyte preparation process. As such, the garnet-type solid electrolyte may have enhanced sintered density and ionic conductivity while having a pure cubic phase crystal structure without including impurities.

In one aspect, the present invention provides a garnet-type solid electrolyte having a cubic phase crystal structure.

The garnet-type solid electrolyte may include a compound represented by the following chemical formula (I).

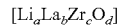

$$[Li_aLa_bZr_cO_d]$$

In particular, in the formula, a is from about 6.3 to about 8, b is from about 2.7 to about 3.3, c is from about 1.7 to about 2.3, and d can be determined based on available valences in view of a, the b and the c. For example, if a is 7, b is 3 and c is 2, d can be 12, as represented by $Li_7La_3Zr_2O_{12}$.

The term "garnet-type" or "garnet" as used herein, refers to as a material having a phase or a crystalline structure of the "garnet" that includes cubic and tetragonal frameworks or structure. As such, the garnet-type solid electrolyte may be formed in garnet-type phase or crystalline structure which includes cubic phases and tetragonal phases. Further, such garnet-type phase or crystalline structure of the solid electrolyte may be formed with components (elements) of compound, preferably Li, La, Zr and O, or alternatively, Li, Al, La, Zr, and O, without other limitation to constituting elements.

The garnet-type solid electrolyte may comprise LLZ ($Li_7La_3Zr_2O_{12}$) having a cubic phase. In particular, the LLZ may comprise Al which substitutes at least a portion of the Li. Preferably, the substituted Al may be of about 0.02 to 1.075 mol.

In another aspect, the present invention provides a method for preparing a garnet-type solid electrolyte represented by the above-mentioned chemical formula (I). The method may comprise: preparing a mixture of LiOH, La(OH)$_3$, ZrO$_2$, and Al$_2$O$_3$. In particular, the mixture may be prepared by first dry mixing. Preferably, the mixture may be prepared by mixing the LiOH, the La(OH)$_3$, and the ZrO$_2$ and by adding the Al$_2$O$_3$ thereto. Alternatively, the mixture may be prepared by mixing the LiOH, the La(OH)$_3$, the ZrO$_2$ and the Al$_2$O$_3$ at the same time.

The garnet-type solid electrolyte may include the LiOH, the La(OH)$_3$ and the ZrO$_2$ at a molar ratio of about 6.5 to 8.3:about 3:about 2.

The garnet-type solid electrolyte may include LLZ (Li$_7$La$_3$Zr$_2$O$_{12}$) having a cubic phase. In particular, the LLZ may comprise Al which substitutes at least a portion of the Li. Preferably, the substituted Al may be of about 0.02 to 1.075 mol. Further, the garnet-type solid electrolyte may include a content of the Al$_2$O$_3$ in an amount of about 0.5 to 1.5% by weight with respect to the total weight of the mixture.

The method may further comprise, after the mixing of Al$_2$O$_3$: first calcinating the mixture for 5 to 7 hours at 800 to 1000° C.; second dry mixing the calcinated mixture after natural cooling; preparing the second dry mixed mixture into pellets of 8 to 12 mm at 120 to 150 MPa; and preparing a cubic phase garnet-type solid electrolyte by second calcinating the prepared pellets for 10 to 40 hours at 1100 to 1300° C.

In addition, the method may further comprise preparing pellets including an amount of about 10 to 80% by weight of the mixture prior to the second calcination, and covering the pellets with the remaining mixture in a powder state.

The method may further comprise analyzing the garnet-type solid electrolyte. The analysis method may be, but not limited to, using X-Ray Diffraction (XRD), Raman Spectroscopy or Inductively Coupled Plasma Mass Spectrometry (ICP-MS).

Further provided in the present invention is an all-solid state battery that comprises the garnet-type solid electrolyte as described herein or the garnet-type solid electrolyte prepared as described herein.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
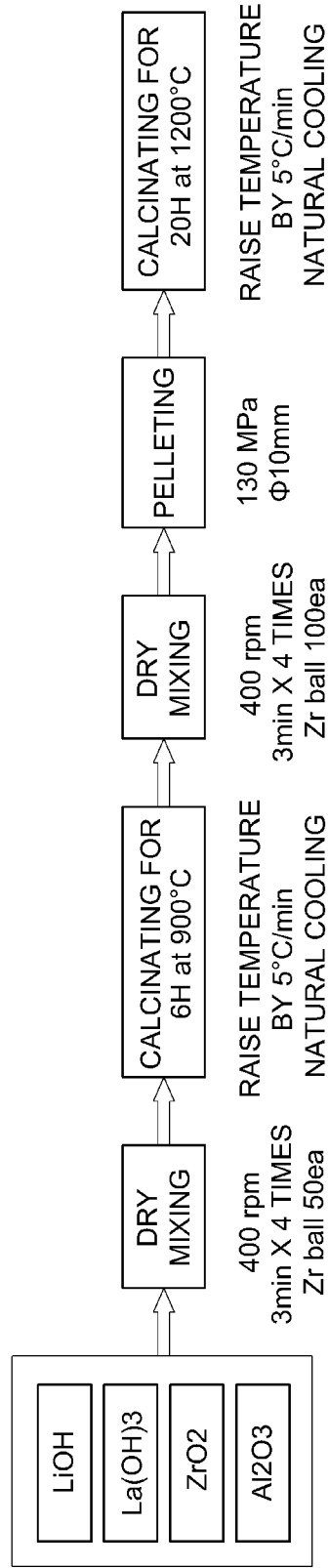
FIG. 1 shown an exemplary synthesis process of an exemplary garnet-type solid electrolyte according to an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles. The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

In one aspect, the present invention provides a garnet-type solid electrolyte that may include a compound represented by the following chemical formula (I).

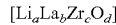

In the formula, a ranges from about 6.3 to about 8, b ranges from about 2.7 to about 3.3, c ranges from about 1.7 to about 2.3, and d can be determined based on available valences in view of a, the b and the c.

The garnet-type solid electrolyte may be formed in two types of structures, i.e. a cubic phase or tetragonal phase. For example, the cubic phase may have an ionic conductivity of about $10^{-4}$ S/cm, and the tetragonal phase may have ion conductivity of about $10^{-6}$ S/cm, as such, the cubic phase is reported to have substantially increased ionic conductivity of about 100 times or greater. Accordingly, the garnet-type solid electrolyte of the present invention may be suitably synthesized to have a cubic phase crystal structure with reduced impurities, a secondary phase or tetragonal phase.

The garnet-type solid electrolyte may include LLZ ($Li_7La_3Zr_2O_{12}$) having a cubic phase, more particularly a cubic phase thereof. In particular, at least a portion of the Li in the LLZ ($Li_7La_3Zr_2O_{12}$) garnet may be substituted with aluminum (Al). The Al may stabilize the cubic phase crystal structure and affect a sintered density increase as a liquid phase sintering effect, and may improve ionic conductivity. Thus, at least a portion of the Li may be suitably substituted with Al during the synthesis.

Preferably, at least a portion of the Li in the LLZ ($Li_7La_3Zr_2O_{12}$) may be substituted with Al, and the substituted Al may be of about 0.02 to 1.075 mol in the formula above. When the mol of the substituted Al is less than about 0.02 mol, garnet having a cubic phase crystal structure may not be sufficiently produced, and when the mol is greater than about 1.075 mol, impurities may be produced thereby causing rapid decrease of the ionic conductivity.

The garnet-type solid electrolyte may have ionic conductivity of about $2 \times 10^{-4}$ to $6 \times 10^{-4}$ S/cm. Preferably, the garnet-type solid electrolyte may have ionic conductivity of about $3.5 \times 10^{-4}$ to $4.8 \times 10^{-4}$ S/cm, or particularly may have ionic conductivity of about $4.3 \times 10^{-4}$ S/cm.

Also provided is a method for preparing a garnet-type solid electrolyte represented by the following chemical formula (I). The method may include preparing a mixture of LiOH, La(OH)$_3$ and ZrO$_2$, and Al$_2$O$_3$.

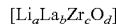 [chemical formula (I)]

In the formula, a ranges from about 6.3 to about 8, b ranges from about 2.7 to about 3.3, c ranges from about 1.7 to about 2.3, and d can be determined based on available valences in view of a, b and c. In particular, the mixture may be prepared by a first dry mixing.

The "dry mixing" as used herein may be performed without any types of water or solvent, such that the mixed materials may not require additional drying process thereafter.

Preferably, the mixture may be prepared by mixing the LiOH, the La(OH)$_3$, and the ZrO$_2$ and by adding the Al$_2$O$_3$ thereto. Alternatively, the mixture may be prepared by mixing the LiOH, the La(OH)$_3$, the ZrO$_2$ and the Al$_2$O$_3$ at the same time.

FIG. 1 is an exemplary synthesis process of an exemplary garnet-type solid electrolyte according to an exemplary embodiment of the present invention. As shown in FIG. 1, the garnet-type solid electrolyte may be prepared by preparing a mixture, by the first dry mixing, that is mixing LiOH, La(OH)$_3$, ZrO$_2$ and Al$_2$O$_3$ at the same time, and subsequently first calcination, second dry mixing, pelleting and second calcination may be performed.

In the garnet-type solid electrolyte, the molar ratio of the LiOH, the La(OH)$_3$ and the ZrO$_2$ may be from about 6.5 to about 8.3:about 3:about 2. When the molar ratio of the LiOH is less than about 6.5 mol, garnet powder having a cubic phase crystal structure may not be sufficiently produced, and when the molar ratio of the LiOH is greater than about 8.3 mol, impurities may be present thereby causing a rapid decrease of ionic conductivity. Preferably, the molar ratio of the Li:La:Zr elements may be of about 7:about 3:about 2. Since Li volatilization may actively occur from a temperature of about 900° C. or higher, the Li atom may be used in greater than about 10 mol % based on the total mol of the mixture. In addition, the garnet-type solid electrolyte may include a LiOH and La(OH)$_3$ precursor containing hydroxide as an initial material instead of a conventional precursor containing carbonate added in a preparation process, and thus, the production of impurities such as Li$_2$CO$_3$ in the pellets may be suppressed thereby enhancing ionic conductivity.

The garnet-type solid electrolyte may include LLZ ($Li_7La_3Zr_2O_{12}$) having a cubic phase. Preferably, at least a portion of the Li in the LLZ may be substituted with Al. Preferably, the substituted Al may be of about 0.02 to 1.075 mol.

The content of the Al$_2$O$_3$ may be from about 0.5 to about 1.5% by weight with respect to the total weigh of the mixture, as described above. When the content of the Al$_2$O$_3$ is less than about 0.5% by weight, crystallizability of the garnet may be reduced, and when the content of the Al$_2$O$_3$ is greater than about 1.5% by weight, impurities (e.g. Al$_3$Zr, Li$_2$ZrO$_3$) may be produced together with a cubic phase. Preferably, the Al$_2$O$_3$ may be doped in about 0.9 to 1.2% by weight, or particularly, in about 1% by weight.

The method for preparing a garnet-type solid electrolyte may further include, after the mixing of Al$_2$O$_3$, first calcinating the mixture for about 5 to 7 hours at a temperature of about 800 to 1000° C.; second dry mixing the calcinated mixture after natural cooling; preparing the second dry mixed mixture into pellets of about 8 to 12 mm at a temperature of about 120 to 150 MPa; and preparing a cubic phase garnet-type solid electrolyte by second calcinating the prepared pellets for about 10 to 40 hours at a temperature of about 1100 to 1300° C.

The preparing of a mixture by first dry mixing may be simply mixing raw material in powder forms, and no energy is transferred to the powders in the process. Further, the method may include a rest time for about 3 minute in each step to prevent the transfer of heat energy into the powders. The mixing method may include a dry method or a wet method, however, dry mixing using a planetary mill may be carried out. In the case of wet mixing, the process time may increase, for example, by one day or more until drying, and side reactions may occur due to solvents. For example, as the mixing condition, the planetary milling condition may be milder, and the number of zirconia balls may be about half amount compared to the second dry mixing.

The $Al_2O_3$ may be added after powders of LiOH, $La(OH)_3$ and $ZrO_2$ are prepared by first dry mixing, or the powder mixture may be prepared by the first dry mixing of LiOH, $La(OH)_3$, $ZrO_2$ and $Al_2O_3$ at the same time as described above, such that Al may be evenly distributed in the mixture. When the $Al_2O_3$ is first dry mixed at the same time, the Al may be distributed much more uniformly into the LLZ ($Li_7La_3Zr_2O_{12}$) garnet. In addition, a conventional $Li_2CO_3$ in the related arts is not used as an initial material in the calcination, and as consequence, sintered density and ionic conductivity may be enhanced since production of carbonic acid functioning as impurities in the pellets is suppressed.

In the first calcination carried out after the mixing of $Al_2O_3$, the first calcination may be carried out for about 5 to 7 hours at a temperature of about 800 to 1000° C. Preferably, the first calcination may be carried out for about 6 hours at about 900° C.

In the preparing of a cubic phase garnet-type solid electrolyte by second calcinating the prepared pellets, the temperature and the time at which the garnet-type solid electrolyte is produced may vary depending on the composition of raw materials. Preferably, the second calcinating may be performed for about 10 to 40 hours at a temperature of about 1100 to 1300° C. In addition, an alumina crucible or zirconia crucible may be used in the calcination, and particularly, the alumina crucible may be used for economical advantages such as reduced costs compared to boron nitride (BN) plate or MgO crucible. Further, a binder may not smear even at a high temperature of 1000° C. or higher, and a crystal phase garnet may be readily formed.

The method for preparing a garnet-type solid electrolyte of the present invention may further include: preparing pellets including an amount of about 10 to 80% by weight of the mixture prior to the second calcination, and covering the pellets with the remaining mixture in a powder state. The lithium composition affecting conductivity may vary by the second calcination process, and in this process, the method may include a process of covering the pellets with the remaining mixture in a powder state in order to prevent lithium volatilization in the garnet-type solid electrolyte since the second calcination process is exposure for a long period of time at a high temperature.

The method for preparing a garnet-type solid electrolyte of the present invention further includes analyzing the garnet-type solid electrolyte; and the analysis may be carried out using X-Ray Diffraction (XRD), Raman Spectroscopy or Inductively Coupled Plasma Mass Spectrometry (ICP-MS). The XRD may identify a garnet-type solid electrolyte phase and impurities, and through the Raman, phases and impurities corresponding to regions having hundreds of micrometers or less, which may not be determined with XRD, may be identified. In addition, using the ICP, differences between target compositions and synthesized compositions may be compared by identifying the compositional ratio of each atom in the garnet-type solid electrolyte.

Accordingly, the garnet-type solid electrolyte according to exemplary embodiments of the present invention may improve sintered density and ionic conductivity while having a pure cubic phase crystal structure without including impurities by adding at least $Al_2O_3$ to a precursor containing hydroxide, which is replacing a conventional precursor containing carbonate added in a garnet-type solid electrolyte preparation process.

EXAMPLES

Hereinafter, the present invention will be described in more detail with reference to examples, however, the present invention is not limited thereto.

Example

First dry mixing was carried out by mixing LiOH, $La(OH)_3$ and $ZrO_2$, which are raw materials, in a molar ratio of 7:3:2, and adding 1% by weight of $Al_2O_3$ thereto, based on the total weight of the mixture formed by the first dry mixing. Next, the first dry mixed mixture was first calcinated for 6 hours at 900° C., and then was naturally cooled. Then, the cooled mixture was dry mixed again (second dry mix), and pellets of 10 mm were prepared at 130 MPa. The prepared pellets were second calcinated for 20 hours at 1200° C. to obtain cubic phase $La_{3.05}Zr_2Li_{6.51}Al_{0.36}O_{12.37}$ garnet. Herein, in the process, the mixture was stored in a glove box before and after the synthesis in order to suppress the production of impurities, and an alumina crucible was used in the calcination process.

Comparative Example 1

$La_{3.16}Zr_2Li_{7.17}Al_{0.68}O_{13.345}$ garnet was obtained by dry mixing and calcinating a mixture in the same manner as in Example, except that the mixture was prepared by first dry mixing $Li_2CO_3$, $La_2O_3$ and $ZrO_2$, which were raw materials, in a molar ratio of 7:3:2.

Comparative Example 2

$La_{3.09}Zr_2Li_{6.45}Al_{0.38}O_{12.43}$ garnet was obtained by dry mixing and calcinating a mixture in the same manner as in Example, except that the mixture was prepared by first dry mixing LiOH, $La_2O_3$ and $ZrO_2$, which were raw materials, in a molar ratio of 7:3:2.

Comparative Example 3

$La_{3.13}Zr_2Li_{7.14}Al_{0.67}O_{13.27}$ garnet was obtained by dry mixing and calcinating a mixture in the same manner as in Example, except that the mixture was prepared by first dry mixing $Li_2CO_3$, $La(OH)_3$ and $ZrO_2$, which were raw materials, in a molar ratio of 7:3:2.

Comparative Example 4

Comparative Example 4 was carried out in the same manner as in Example, except that the first dry mixing was carried out without mixing $Al_2O_3$.

Comparative Example 5

Comparative Example 5 was carried out in the same manner as in Example, except that the first dry mixing was carried out with adding $Al_2O_3$ in 2% by weight, based on the total weight of the mixture formed by the first dry mixing.

Comparative Example 6

Comparative Example 6 was carried out in the same manner as in Example, except that the first dry mixing was carried out with adding $Al_2O_3$ in 3% by weight, based on the total weight of the mixture formed by the first dry mixing.

Comparative Example 7

Comparative Example 7 was carried out in the same manner as in Example, except that the first dry mixing was carried out with adding $Al_2O_3$ in 4% by weight, based on the total weight of the mixture formed by the first dry mixing.

Comparative Example 8

Comparative Example 8 was carried out in the same manner as in Example, except that the first dry mixing was carried out with adding $Al_2O_3$ in 5% by weight, based on the total weight of the mixture formed by the first dry mixing.

Test Example 1: Measurement of $Al_2O_3$ Doping Amount and Inductively Coupled Plasma Mass Spectrometry (ICP-MS) of Garnet Prepared in Example and Comparative Examples 1 to 3

As the $Al_2O_3$ doping amount of the garnet prepared in Example and Comparative Examples 1 to 3, an initial doping amount and an actual doping amount were each measured, and the analysis was carried out using an ICP-MS device in order to identify the lithium content (mol). The results are shown in the following Table 1.

TABLE 1

| Category | $Al_2O_3$ (% by weight) Initial Doping Amount | Target Composition | $Al_2O_3$ (% by weight) Actual Doping Amount | Synthesized Composition |
|---|---|---|---|---|
| Example | 1 | $La_3Zr_2Li_7Al_{0.346}O_{12.519}$ | 1.06 | $La_{3.05}Zr_2Li_{6.51}Al_{0.36}O_{12.37}$ |
| Comparative Example 1 | 1 | $La_3Zr_2Li_7Al_{0.196}O_{12.294}$ | 3.27 | $La_{3.16}Zr_2Li_{7.17}Al_{0.68}O_{13.345}$ |
| Comparative Example 2 | 1 | $La_3Zr_2Li_7Al_{0.248}O_{12.372}$ | 1.56 | $La_{3.09}Zr_2Li_{6.45}Al_{0.38}O_{12.43}$ |
| Comparative Example 3 | 1 | $La_3Zr_2Li_7Al_{0.293}O_{12.4395}$ | 2.18 | $La_{3.13}Zr_2Li_{7.14}Al_{0.67}O_{13.27}$ |

As shown from the results in Table 1, the garnet prepared in Example and Comparative Examples 1 to 3 had a difference in the initial doping amount and the actual doping amount of the added $Al_2O_3$ due to the alumina crucible used in the calcination process. In Comparative Examples 1 to 3, there was a difference of as few as 0.56% by weight and as much as 2.27% by weight from the initial doping amount.

Meanwhile, in Example using LiOH as a precursor, the actual doping amount added was similar to the initial doping amount. This indicates that, when a LiOH precursor is used, changes in the amount of $Al_2O_3$ added by the use of an alumina crucible are irrelevant.

Test Example 2: X-Ray Diffraction (XRD) Measurement of Garnet Prepared in Example and Comparative Examples 1 to 3

Figure 2:
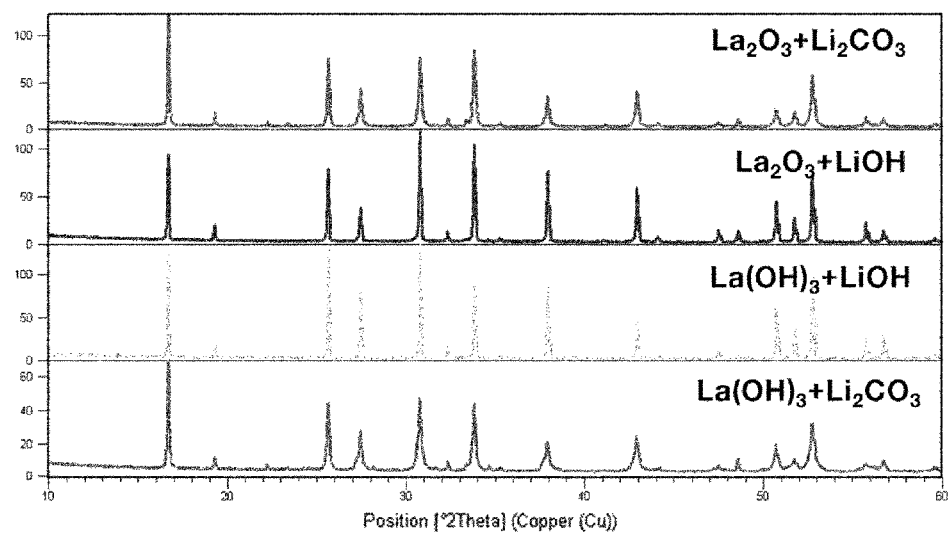
FIG. 2 shows XRD measurement results of garnet prepared in Example and Comparative Examples 1 to 3 according to an exemplary embodiment of the present invention.

Peaks were analyzed using an XRD device in order to identify crystallizability of the garnet prepared in Example and Comparative Examples 1 to 3, and the results are shown in FIG. 2.

FIG. 2 shows an XRD measurement result of the garnet prepared in Example and Comparative Examples 1 to 3. As shown in FIG. 2, the garnet prepared in Example and Comparative Examples 1 to 3 all had a cubic phase crystal structure, however, in the case of Comparative Example 3, peaks were relatively low, and it was seen that crystallizability was low.

Test Example 3: Sintered Density and Ionic Conductivity Measurement of Garnet Prepared in Example and Comparative Examples 1 to 3

Sintered density and ionic conductivity of the garnet prepared in Example and Comparative Examples 1 to 3 were measured, and the results are shown in the following Table 2, and FIGS. 3 and 4.

TABLE 2

| Category | ICP | Sintered Density (%) | Ionic Conductivity σt (/Ωcm) |
|---|---|---|---|
| Example ($La(OH)_3$ + LiOH) | Li 6.51 mol $Al_2O_3$ 1.06% by weight | 88 | $4.32 \times 10^{-4}$ |
| Comparative Example 1 ($La_2O_3$ + $Li_2CO_3$) | Li 7.17 mol $Al_2O_3$ 3.27% by weight | 85 | $2.69 \times 10^{-4}$ |
| Comparative Example 2 ($La_2O_3$ + LiOH) | Li 6.45 mol $Al_2O_3$ 1.56% by weight | 82 | $3.57 \times 10^{-4}$ |
| Comparative Example 3 ($La(OH)_3$ + $Li_2CO_3$) | Li 7.14 mol $Al_2O_3$ 2.18% by weight | 80 | $3.79 \times 10^{-5}$ |

As shown in Table 2, Comparative Examples 1 to 3 in which $Al_2O_3$ was added in 1.56% by weight or greater, had a tendency of sintered density being reduced to 85% by weight or less, and particularly, Comparative Example 3 showed the lowest sintered density and ionic conductivity.

Meanwhile, Example including hydroxide as a La and Li precursor and having an added $Al_2O_3$ content of 1.06% by weight had the highest sintered density of 88%, and also had excellent ionic conductivity.

Figure 3:
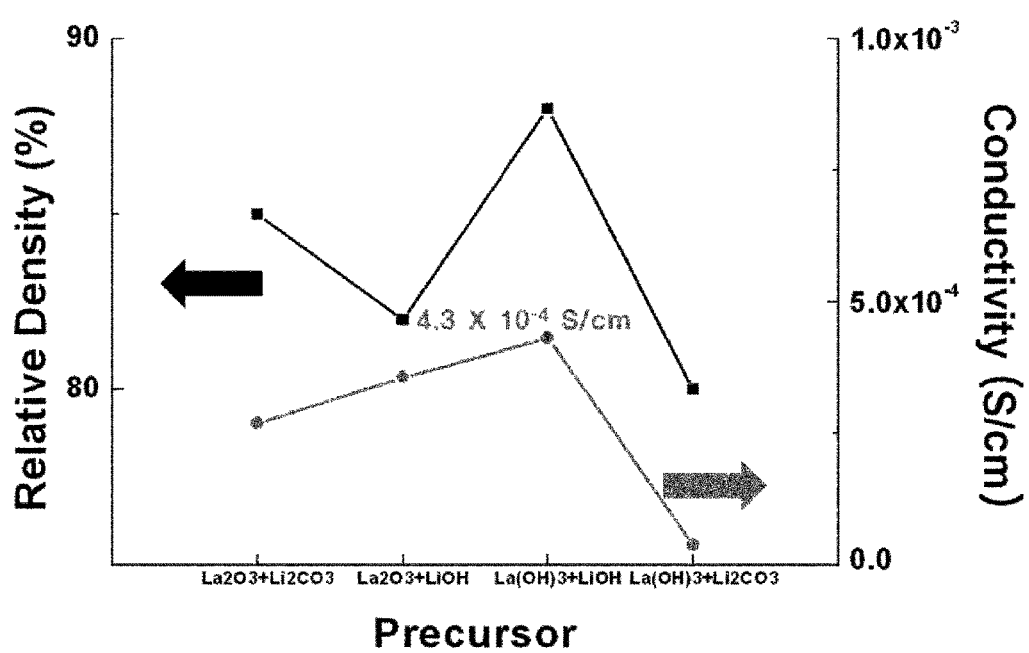
FIG. 3 shows sintered density and ionic conductivity graphs of garnet prepared in Example and Comparative Examples 1 to 3 according to an exemplary embodiment of the present invention.

FIG. 3 is a sintered density and ionic conductivity graph of the garnet prepared in Example and Comparative Examples 1 to 3. As shown in FIG. 3, both sintered density and ionic conductivity were excellent in Example (La$(OH)_3$+LiOH).

Figure 4:
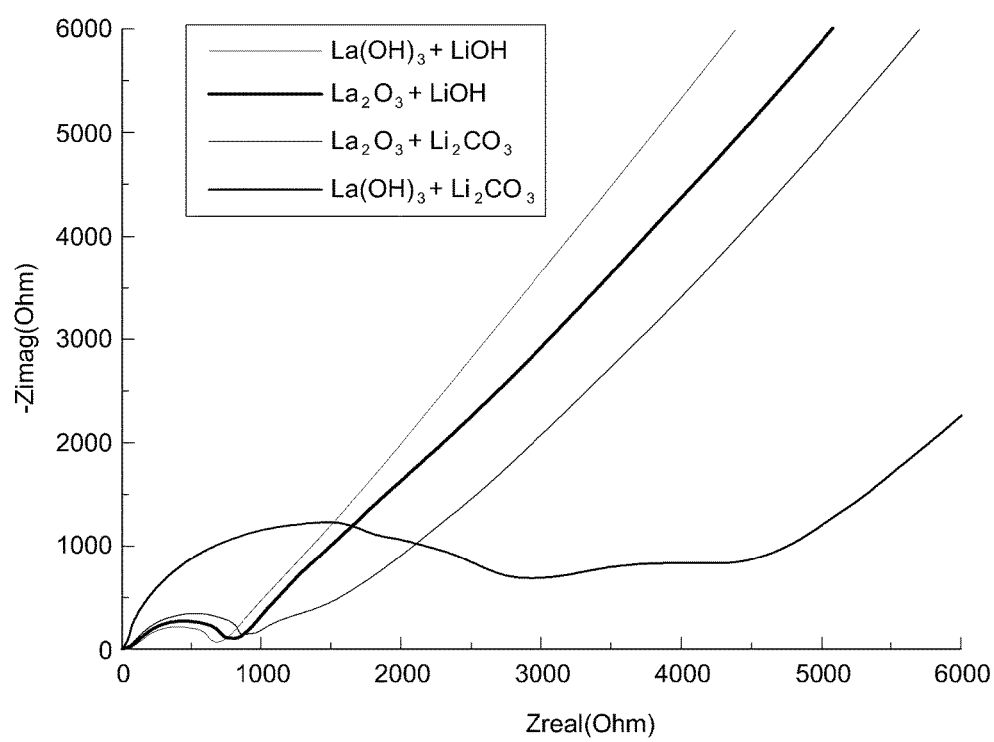
FIG. 4 shows impedance measurement results of garnet prepared in Example and Comparative Examples 1 to 3 according to an exemplary embodiment of the present invention.

FIG. 4 is an impedance measurement result of the garnet prepared in Example and Comparative Examples 1 to 3. The impedance measurement was carried out at a frequency of 20 MHz to 1 Hz and a voltage of 30 mV using a symmetry ion blocking electrode (Au sputter 100 nm). In FIG. 4, one semicircle was observed for each sample, which was a phenomenon occurring from an overlap of grain resistance and grain boundary resistance due to the nature of garnet. In addition, since total resistance is a sum of grain resistance and grain boundary resistance, the total resistance was low and ionic conductivity was excellent as the diameter of the appeared semicircle was smaller. Accordingly, when a LiOH and La(OH)$_3$ precursor containing a hydroxyl group were used together, conductivity was most excellent.

Test Example 4: X-Ray Diffraction (XRD) Measurement of Garnet Prepared in Example and Comparative Examples 4 to 8

Figure 5:
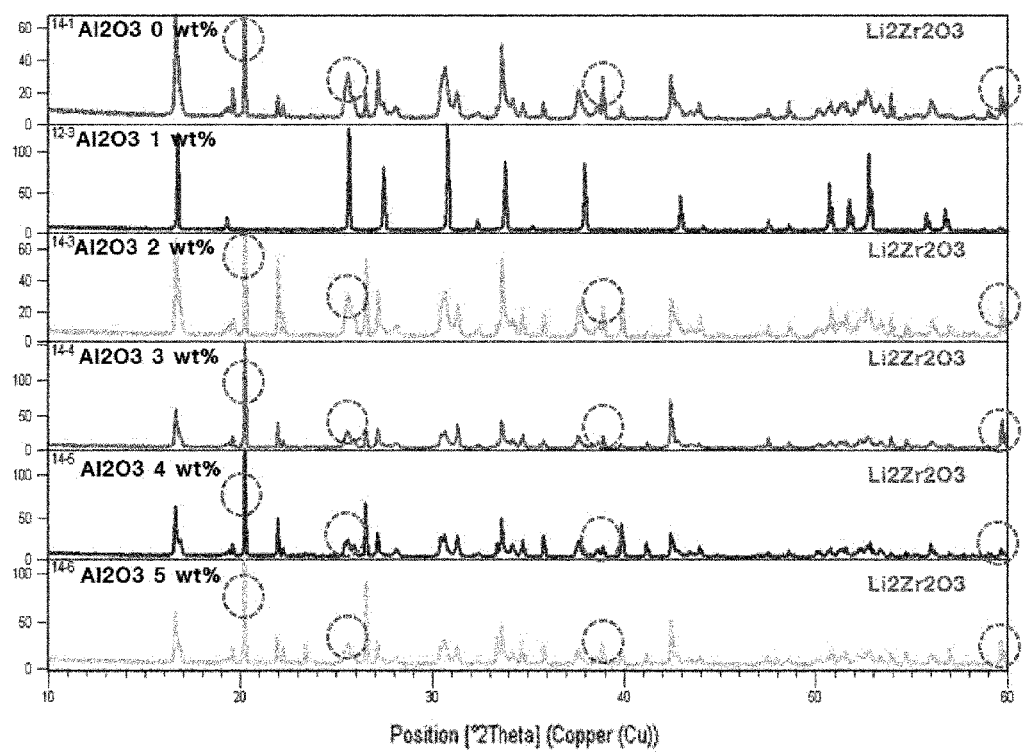
FIG. 5 shows XRD measurement results of garnet prepared in Example and Comparative Examples 4 to 8 according to an exemplary embodiment of the present invention.

Peaks were analyzed using an XRD device in order to identify crystallizability of the garnet prepared in Example and Comparative Examples 4 to 8, and the results are shown in FIG. 5.

FIG. 5 is an XRD measurement result of the garnet prepared in Example and Comparative Examples 4 to 8. As shown in FIG. 5, in Comparative Examples 4 to 8 in which Al$_2$O$_3$ was mixed in 0, 2, 3, 4 and 5% by weight, respectively, Li$_2$Zr$_2$O$_3$ impurities were observed, and the peaks were irregular and low, therefore, it was seen that garnet crystallizability was very low.

Meanwhile, in Example in which Al$_2$O$_3$ was mixed in 1% by weight, since impurities were not observed and peaks were distinct, it was seen that crystallizability was high.

Test Example 5: Raman Spectroscopy Measurement of Garnet Prepared in Example and Comparative Examples 4 to 8

Peaks were analyzed using a Raman Spectroscopy device in order to identify a crystal phase and impurities of the garnet prepared in Example and Comparative Examples 4 to 8, and the results are shown in FIGS. 6A to 6F.

Figure 6A:
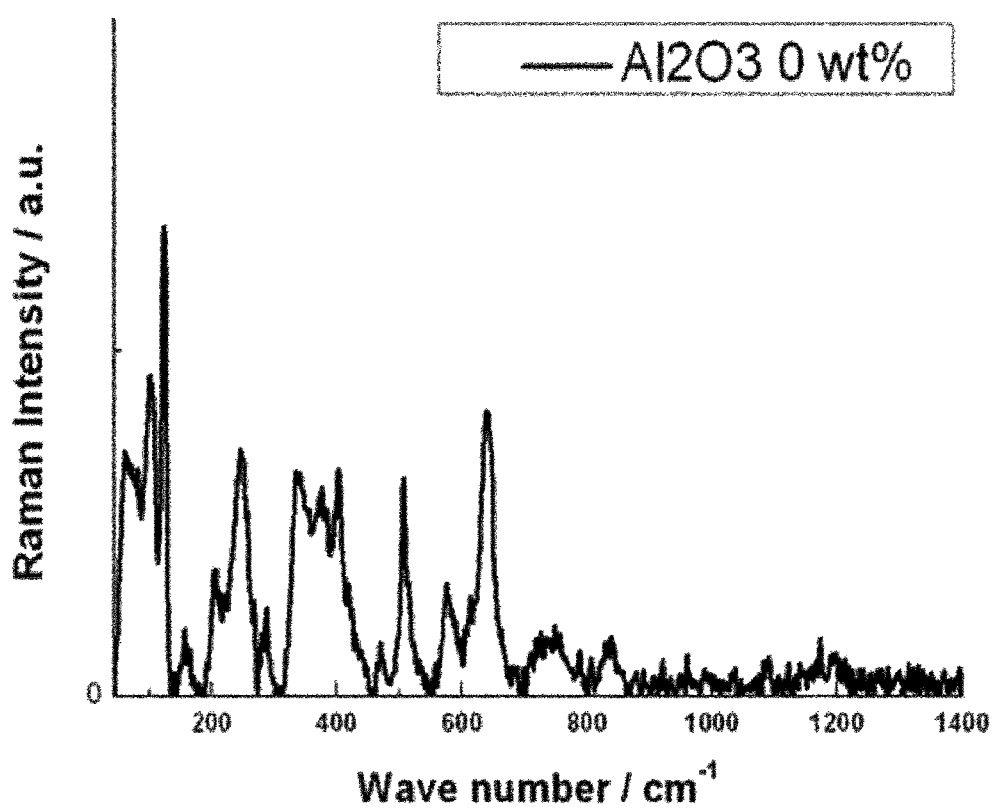
FIG. 6A shows a Raman spectroscopy measurement of a garnet prepared in Comparative Example 4.
Figure 6B:
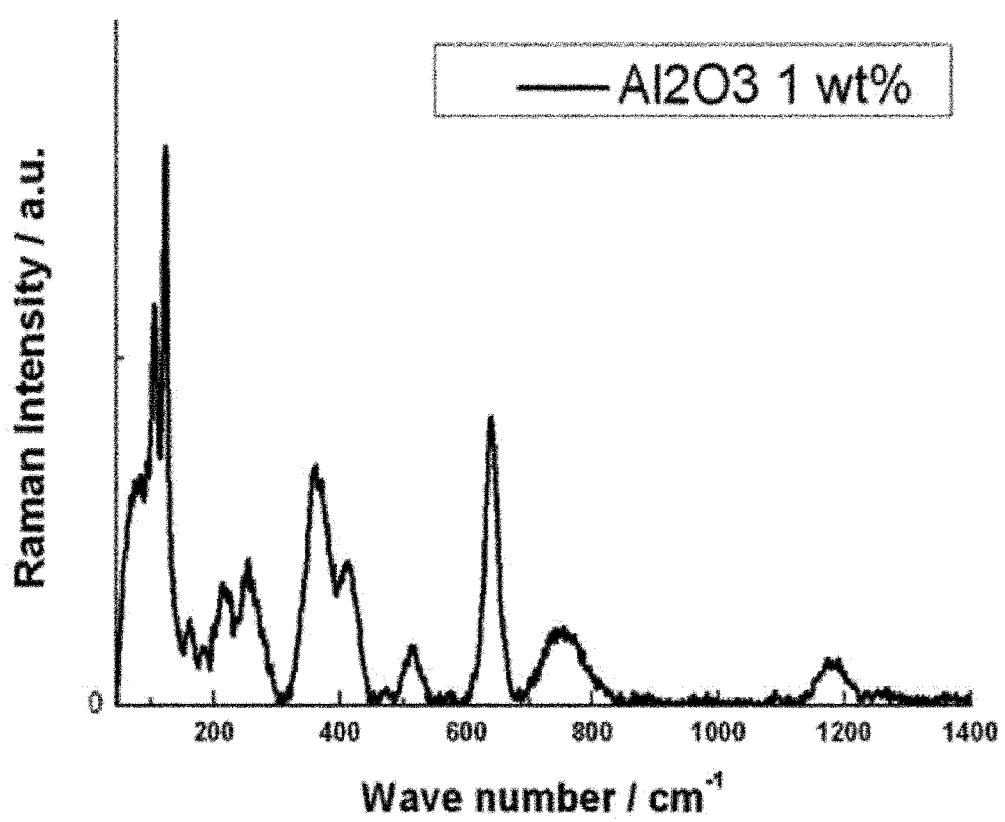
FIG. 6B shows a Raman spectroscopy measurement of an exemplary garnet prepared in Example according to an exemplary embodiment of the present invention.
Figure 6C:
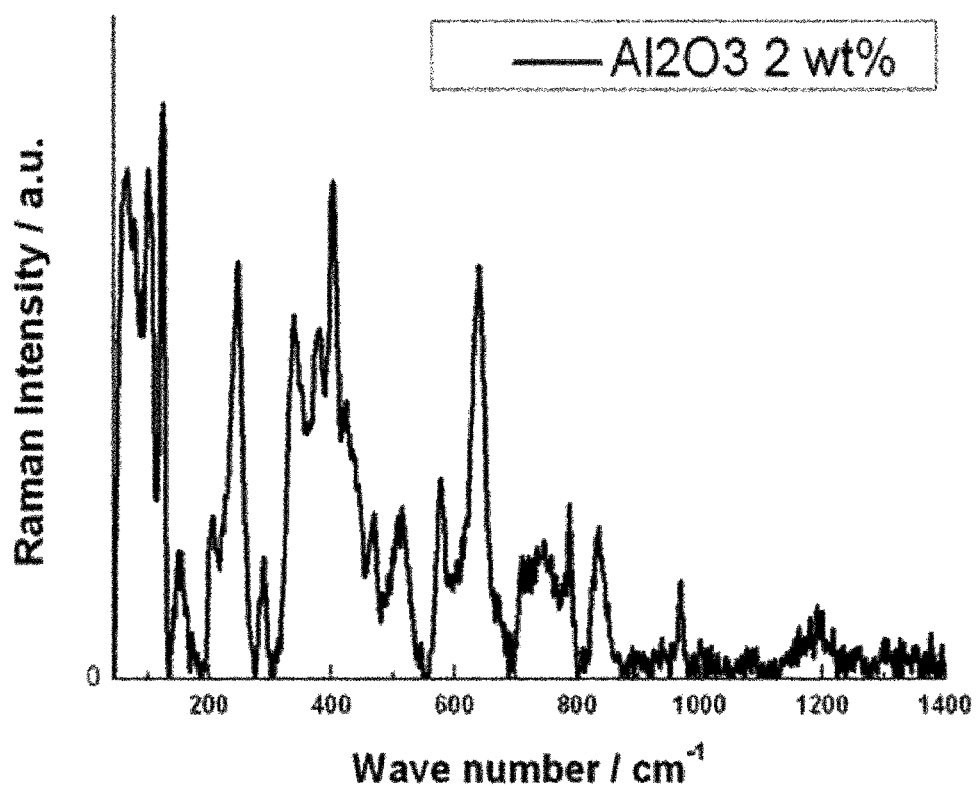
FIG. 6C shows a Raman spectroscopy measurement of a garnet prepared in Comparative Example 5.
Figure 6D:
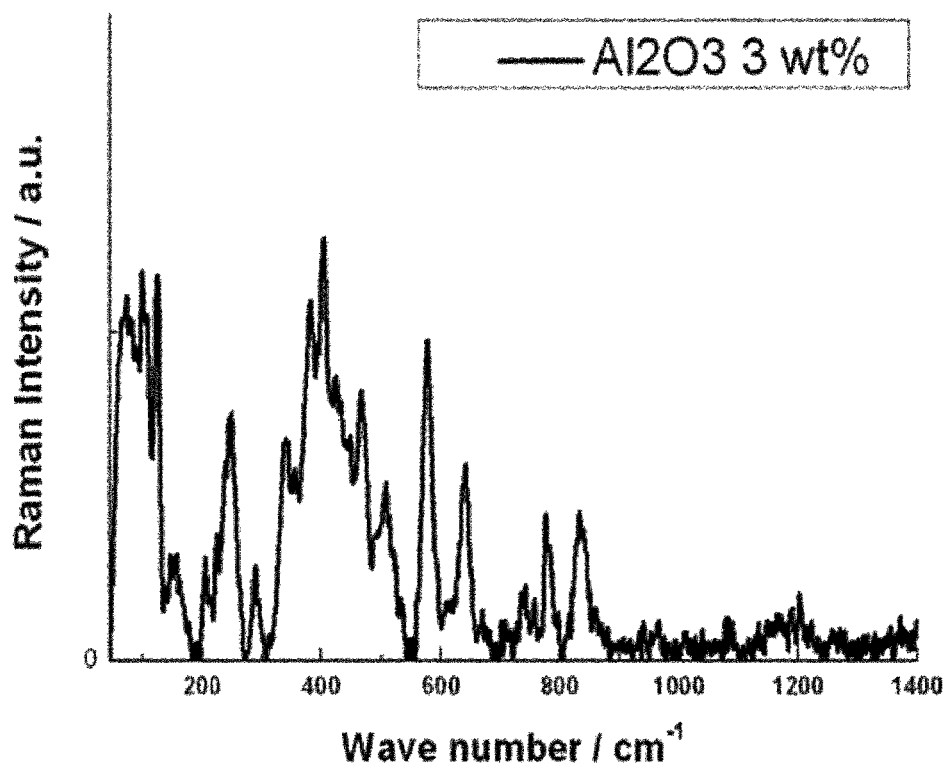
FIG. 6D shows a Raman spectroscopy measurement of a garnet prepared in Comparative Example 6.
Figure 6E:
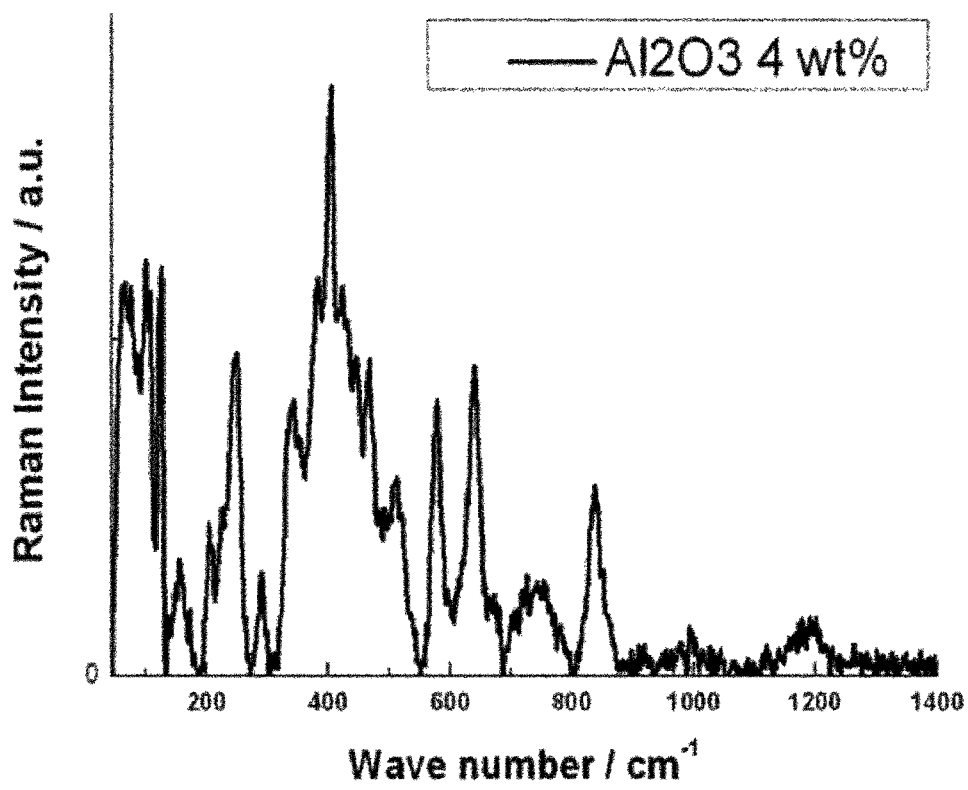
FIG. 6E shows a Raman spectroscopy measurement of a garnet prepared in Comparative Example 7.
Figure 6F:
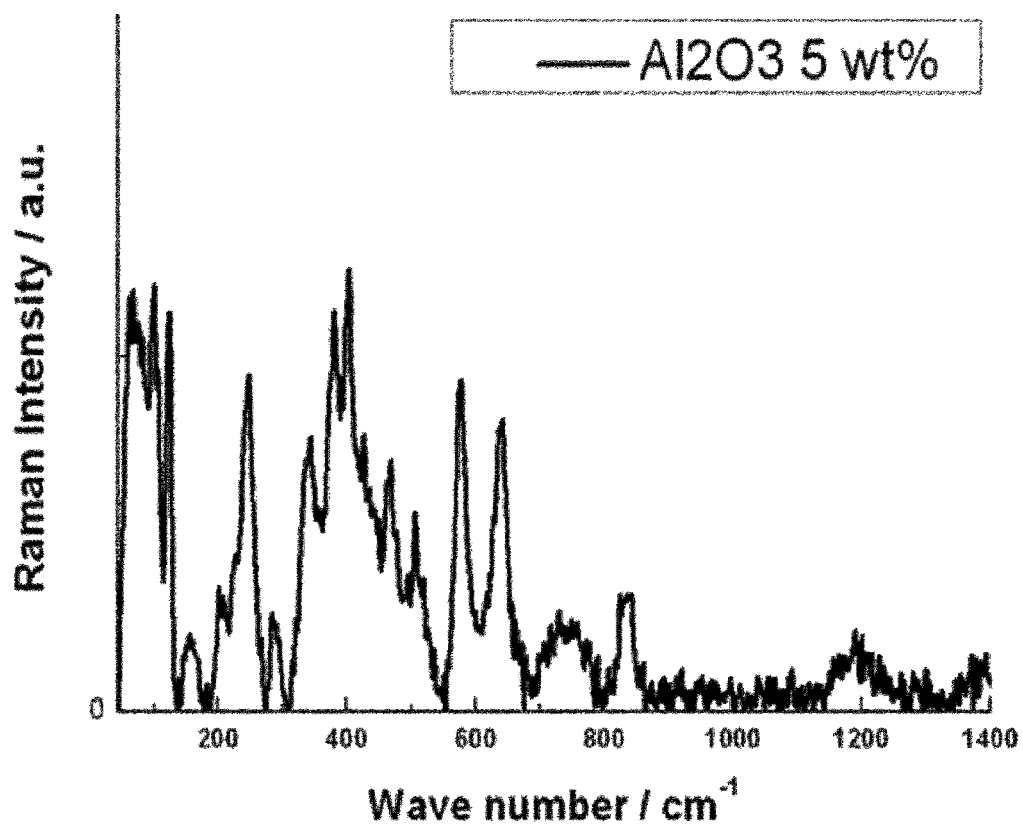
FIG. 6F shows a Raman spectroscopy measurement of a garnet prepared in Comparative Example 8.

FIG. 6A is a Raman spectroscopy measurement result of the garnet prepared in Comparative Example 4, FIG. 6B is a Raman spectroscopy measurement result of the garnet prepared in Example, and FIG. 6C is a Raman spectroscopy measurement result of the garnet prepared in Comparative Example 5. In addition, FIG. 6D is a Raman spectroscopy measurement result of the garnet prepared in Comparative Example 6, FIG. 6E is a Raman spectroscopy measurement result of the garnet prepared in Comparative Example 7, and FIG. 6F is a Raman spectroscopy measurement result of the garnet prepared in Comparative Example 8.

As shown in FIGS. 6A, 6C to 6F, peaks were observed to be widely distributed and splitted compared to the peaks in FIG. 6B, and a crystal phase was difficult to be identified due to such impurity peaks. In contrast, in FIG. 6B, clear peaks were identified and garnet having a favorable cubic phase was obtained.

Test Example 6: Ionic Conductivity Measurement of Garnet Prepared in Example and Comparative Examples 4 to 8

Ionic conductivity of the garnet prepared in Example and Comparative Examples 4 to 8 was measured, and the results are shown in the following Table 3.

TABLE 3

| Category | Added Amount of Al$_2$O$_3$ (% by weight) | Ionic Conductivity (S/cm) |
|---|---|---|
| Comparative Example 4 | 0 | 2.64 × 10$^{-6}$ |
| Example | 1 | 4.3 × 10$^{-4}$ |
| Comparative Example 5 | 2 | 1.33 × 10$^{-6}$ |
| Comparative Example 6 | 3 | 1.34 × 10$^{-6}$ |
| Comparative Example 7 | 4 | 4.21 × 10$^{-7}$ |
| Comparative Example 8 | 5 | 9.32 × 10$^{-7}$ |

As shown in Table 3, Example, in which a LiOH and La(OH)$_3$ precursor were used and Al$_2$O$_3$ was mixed in 1% by weight, showed the highest ionic conductivity compared to Comparative Examples 4 to 8. The ionic conductivity was enhanced since crystallizability became favorable due to a cubic phase and lithium ions were smooth.

Accordingly, the garnet-type solid electrolyte prepared in Example was identified to have an effect of suppressing the production of impurities such as Li$_2$CO$_3$, and increasing sintered density by mixing a LiOH and La(OH)$_3$ precursor containing hydroxide instead of an existing precursor containing carbonate used to be added in a preparation process. In addition, by adding a small amount of Al$_2$O$_3$ together, an effect of enhancing sintered density and ionic conductivity while having a pure cubic phase crystal structure without including impurities was identified.

The garnet-type solid electrolyte according to various exemplary embodiments of the present invention may enhance sintered density and ionic conductivity while having a pure cubic phase crystal structure without including impurities by adding a small amount of Al$_2$O$_3$ to a precursor containing hydroxide instead of an existing precursor containing carbonate added in a preparation process.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method for preparing a garnet solid electrolyte including Al which substitutes at least a portion of Li, the method comprising:
   preparing a mixture of LiOH, La(OH)$_3$, ZrO$_2$, and Al$_2$O$_3$;
   first calcinating the mixture for 5 to 7 hours at 800 to 1000° C.;
   dry mixing the calcinated mixture after natural cooling;
   preparing pellets of 8 to 12 mm using 10 to 80% by weight of the mixture at 120 to 150 MPa, and covering the pellets with the remaining mixture in a powder state; and
   preparing a cubic phase garnet solid electrolyte by second calcinating the prepared pellets for 10 to 40 hours at 1100 to 1300° C.

2. The method of claim 1, wherein the mixture is prepared by a first dry mixing.

3. The method of claim 1, wherein, the mixture is prepared by mixing the LiOH, the La(OH)$_3$, and the ZrO$_2$ and by adding the Al$_2$O$_3$ thereto.

4. The method of claim 1, wherein the mixture is prepared by mixing the LiOH, the La(OH)$_3$, the ZrO$_2$ and the Al$_2$O$_3$ at the same time.

5. The method for preparing a garnet solid electrolyte of claim 1, wherein the garnet solid electrolyte includes the LiOH, the La(OH)$_3$ and the ZrO$_2$ at a molar ratio of about 6.5 to 8.3:about 3:about 2.

6. The method of claim 1, wherein the garnet solid electrolyte includes LLZ (Li$_7$La$_3$Zr$_2$O$_{12}$) having a cubic phase.

7. The method of claim 1, wherein the garnet solid electrolyte comprises a content of the Al$_2$O$_3$ in an amount of about 0.5 to 1.5% by weight with respect to the total weight of the mixture.

8. The method of claim 1, further comprising analyzing the garnet solid electrolyte, wherein the analysis is carried out using X-Ray Diffraction (XRD), Raman Spectroscopy or Inductively Coupled Plasma Mass Spectrometry (ICP-MS).

* * * * *